United States Patent
Ely et al.

(10) Patent No.: US 11,491,616 B2
(45) Date of Patent: Nov. 8, 2022

(54) POWER TOOLS WITH USER-SELECTABLE OPERATIONAL MODES

(71) Applicant: Ingersoll-Rand Industrial U.S., Inc., Davidson, NC (US)

(72) Inventors: Sean C. Ely, Flemington, NJ (US); Pinhua Xie, Kendall Park, NJ (US); Jason Christopher Bartoszek, Bethlehem, PA (US); Joshua Odell Johnson, Allentown, PA (US); Warren A. Seith, Bethlehem, PA (US); Vikram Madineni, Somerset, NJ (US); Timothy Richard Cooper, Titusville, NJ (US)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 257 days.

(21) Appl. No.: 15/172,501

(22) Filed: Jun. 3, 2016

(65) Prior Publication Data
US 2016/0354905 A1    Dec. 8, 2016

Related U.S. Application Data

(60) Provisional application No. 62/171,504, filed on Jun. 5, 2015.

(51) Int. Cl.
*B25B 21/02* (2006.01)
*B25B 21/00* (2006.01)
*H02P 23/00* (2016.01)

(52) U.S. Cl.
CPC ............ *B25B 21/008* (2013.01); *B25B 21/02* (2013.01); *H02P 23/0027* (2013.01)

(58) Field of Classification Search
CPC ... B25B 21/02; B25B 23/1475; B25B 21/008; B25B 23/147; B25F 5/001
(Continued)

(56) References Cited

U.S. PATENT DOCUMENTS 1,495,153 A   5/1924  Benjamin
2,531,800 A * 11/1950 Anderson ............ B25D 17/043
                                                    16/431
(Continued)

FOREIGN PATENT DOCUMENTS

CN    1575218 A    2/2005
CN    1583370 A    2/2005
(Continued)

OTHER PUBLICATIONS

International Search Report dated Oct. 7, 2016; PCT/US2016/035807; Filing Date Jun. 3, 2016.
(Continued)

*Primary Examiner* — Gloria R Weeks
(74) *Attorney, Agent, or Firm* — Kevin E. West; Advent, LLP

(57) ABSTRACT

A hand-held power tool is provided that includes a housing assembly, an output spindle, and a motor endbell. The housing assembly supports an electric motor having a rotor configured to rotate when the electric motor is supplied with power. The output spindle protrudes from an output end of the housing assembly, and is functionally coupled to the rotor such that the output spindle rotates in response to a rotation of the rotor. The motor endbell is located on the housing assembly adjacent the electric motor and opposite the output spindle. An illustrative controller is operable to determine phases of a fastening operation in which the hand-held power tool is operating. The phases of the fastening operation of the hand-held power tool include two phases including: (1) a continuous run phase and (2) an impacting phase.

6 Claims, 6 Drawing Sheets

(58) Field of Classification Search
USPC .................................. 173/2–11, 176–183
See application file for complete search history.

(56) References Cited

U.S. PATENT DOCUMENTS

| | | | |
|---|---|---|---|
| 2,543,979 A | 3/1951 | Maurer | |
| 2,637,825 A | 5/1953 | Moore | |
| 2,855,679 A | 10/1958 | Gibble | |
| 2,858,701 A | 11/1958 | Willcox | |
| 2,984,210 A * | 5/1961 | Fuehrer | B25D 17/043 |
| | | | 16/431 |
| 3,221,192 A | 11/1965 | Franklin | |
| 3,225,232 A | 12/1965 | Turley et al. | |
| 3,336,490 A | 8/1967 | Yelpo et al. | |
| 3,353,078 A | 11/1967 | Maynard | |
| 3,440,465 A | 4/1969 | Pratt et al. | |
| 3,451,492 A * | 6/1969 | Blomberg | B25D 17/245 |
| | | | 16/431 |
| 3,572,447 A * | 3/1971 | Pauley | B25B 23/1453 |
| | | | 173/182 |
| 3,578,091 A * | 5/1971 | States | B25B 23/1453 |
| | | | 173/176 |
| 3,592,087 A * | 7/1971 | Pauley | B25B 21/02 |
| | | | 173/176 |
| 3,611,095 A | 10/1971 | Schnizler | |
| 3,643,749 A * | 2/1972 | Pauley | B25B 23/1453 |
| | | | 173/176 |
| 3,703,933 A * | 11/1972 | Schoeps | B25B 23/1453 |
| | | | 173/178 |
| 3,710,873 A * | 1/1973 | Allen | B25B 23/1453 |
| | | | 173/176 |
| 3,741,313 A * | 6/1973 | States | B25B 23/1453 |
| | | | 173/176 |
| 3,760,209 A | 9/1973 | Hult | |
| 3,835,934 A * | 9/1974 | Schoeps | B25B 23/1453 |
| | | | 173/176 |
| 3,894,254 A | 7/1975 | Holther, Jr. | |
| 3,908,766 A * | 9/1975 | Hess | B25B 23/1453 |
| | | | 173/178 |
| 3,920,082 A * | 11/1975 | Dudek | B25B 21/00 |
| | | | 173/182 |
| 4,032,806 A | 6/1977 | Seely | |
| 4,156,821 A | 5/1979 | Kurome et al. | |
| 4,284,109 A | 4/1981 | Kilmer et al. | |
| 4,292,571 A | 9/1981 | Cuneo | |
| 4,307,325 A | 12/1981 | Saar | |
| 4,412,158 A | 10/1983 | Jefferson et al. | |
| 4,454,459 A | 6/1984 | Huber | |
| 4,506,743 A | 3/1985 | Grossmann | |
| 4,510,404 A | 4/1985 | Barrett et al. | |
| 4,513,381 A | 4/1985 | Houser, Jr. et al. | |
| 4,597,419 A | 7/1986 | Galloup et al. | |
| 4,661,756 A | 4/1987 | Murphy et al. | |
| 4,791,833 A | 12/1988 | Sakai et al. | |
| 4,838,361 A | 6/1989 | O'Toole | |
| 4,893,942 A | 1/1990 | Stottmann | |
| 4,978,877 A | 12/1990 | Quirijnen | |
| 4,991,472 A | 2/1991 | Hollingsworth | |
| 5,014,793 A * | 5/1991 | Germanton | B25B 21/00 |
| | | | 173/181 |
| 5,105,130 A | 4/1992 | Barker et al. | |
| 5,138,243 A | 8/1992 | Kress et al. | |
| 5,200,658 A | 4/1993 | Kohno et al. | |
| 5,203,242 A | 4/1993 | Hansson | |
| 5,360,072 A * | 11/1994 | Lange | E21B 41/0021 |
| | | | 173/176 |
| 5,365,155 A | 11/1994 | Zimmermann | |
| 5,473,519 A | 12/1995 | McCallops et al. | |
| 5,525,842 A | 6/1996 | Leininger | |
| 5,526,460 A | 6/1996 | DeFrancesco et al. | |
| 5,531,278 A | 7/1996 | Lin | |
| 5,561,734 A | 10/1996 | Simonsen et al. | |
| 5,563,482 A * | 10/1996 | Shaw | B23P 19/066 |
| | | | 173/176 |
| 5,712,543 A | 1/1998 | Sjostrom | |
| 5,714,815 A | 2/1998 | Fritzinger et al. | |
| 5,714,861 A | 2/1998 | Hansen et al. | |
| 5,738,177 A | 4/1998 | Schell et al. | |
| 5,804,936 A | 9/1998 | Brodsky et al. | |
| 5,897,454 A | 4/1999 | Cannaliato | |
| 5,992,257 A | 11/1999 | Nemetz et al. | |
| 5,998,897 A | 12/1999 | Bosten et al. | |
| 6,037,724 A | 3/2000 | Buss et al. | |
| 6,043,575 A | 3/2000 | Ghode | |
| 6,318,189 B1 | 11/2001 | Donaldson | |
| 6,353,705 B1 | 3/2002 | Capps et al. | |
| 6,359,355 B1 | 3/2002 | Hartsfield et al. | |
| 6,424,799 B1 | 7/2002 | Gilmore | |
| 6,508,313 B1 | 1/2003 | Carney et al. | |
| 6,511,200 B2 | 1/2003 | Matsunaga | |
| 6,536,536 B1 * | 3/2003 | Gass | B23B 31/123 |
| | | | 173/171 |
| 6,598,684 B2 | 7/2003 | Watanabe | |
| 6,607,041 B2 | 8/2003 | Suzuki et al. | |
| 6,691,796 B1 | 2/2004 | Wu | |
| 6,713,905 B2 | 3/2004 | Hirschburger et al. | |
| 6,725,945 B2 | 4/2004 | Sugimoto et al. | |
| 6,814,461 B2 | 11/2004 | Minalga | |
| 6,933,632 B2 | 8/2005 | Braml et al. | |
| 6,945,337 B2 | 9/2005 | Kawai et al. | |
| 6,948,647 B1 | 9/2005 | Niblett et al. | |
| 6,968,908 B2 | 11/2005 | Tokunaga et al. | |
| 6,988,897 B2 * | 1/2006 | Belongia | H01R 13/6205 |
| | | | 219/481 |
| 7,058,291 B2 | 6/2006 | Weaver et al. | |
| 7,090,032 B2 | 8/2006 | Wada et al. | |
| 7,109,675 B2 | 9/2006 | Matsunaga et al. | |
| 7,112,934 B2 | 9/2006 | Gilmore | |
| 7,152,329 B2 | 12/2006 | Kondo et al. | |
| 7,155,986 B2 | 1/2007 | Kawai et al. | |
| 7,201,235 B2 | 4/2007 | Umemura et al. | |
| 7,235,940 B2 * | 6/2007 | Bosch | B25B 23/147 |
| | | | 173/4 |
| 7,236,243 B2 | 6/2007 | Beecroft et al. | |
| 7,237,622 B2 | 7/2007 | Liao | |
| 7,311,027 B1 * | 12/2007 | Tatsuno | B25B 21/00 |
| | | | 173/176 |
| 7,322,427 B2 | 1/2008 | Shimma et al. | |
| 7,331,406 B2 * | 2/2008 | Wottreng, Jr. | B25B 23/045 |
| | | | 173/176 |
| 7,334,648 B2 | 2/2008 | Arimura | |
| 7,372,228 B2 * | 5/2008 | Hahn | H02P 25/145 |
| | | | 173/176 |
| 7,397,153 B2 | 7/2008 | Buck et al. | |
| 7,398,834 B2 * | 7/2008 | Jung | B25D 16/006 |
| | | | 173/11 |
| 7,419,013 B2 | 9/2008 | Sainomoto et al. | |
| 7,494,437 B2 | 2/2009 | Chen | |
| 7,578,357 B2 * | 8/2009 | Schell | B25B 23/1456 |
| | | | 173/1 |
| 7,588,094 B2 | 9/2009 | Lin | |
| 7,600,577 B2 * | 10/2009 | Simm | H02K 11/215 |
| | | | 173/176 |
| 7,607,493 B2 | 10/2009 | Erhardt | |
| 7,665,392 B2 * | 2/2010 | Tokunaga | F16D 7/08 |
| | | | 81/474 |
| 7,677,752 B2 | 3/2010 | Tadokoro et al. | |
| 7,705,482 B2 | 4/2010 | Leininger | |
| 7,712,546 B2 * | 5/2010 | Tokunaga | B25B 21/00 |
| | | | 173/156 |
| 7,717,192 B2 | 5/2010 | Schroeder et al. | |
| 7,821,217 B2 * | 10/2010 | Abolhassani | H02P 21/0089 |
| | | | 318/432 |
| 7,839,112 B2 * | 11/2010 | Wei | H02P 7/295 |
| | | | 318/432 |
| 7,882,899 B2 | 2/2011 | Borinato et al. | |
| 7,928,615 B2 | 4/2011 | Miyashita | |
| 7,942,211 B2 * | 5/2011 | Scrimshaw | B25F 5/001 |
| | | | 173/48 |
| 7,980,320 B2 * | 7/2011 | Inagaki | B25F 5/001 |
| | | | 173/5 |
| 8,016,048 B2 | 9/2011 | Ueda et al. | |

(56) References Cited

U.S. PATENT DOCUMENTS

| | | |
|---|---|---|
| 8,122,971 B2 | 2/2012 | Whitmire et al. |
| 8,197,379 B1 | 6/2012 | Yin |
| 8,210,275 B2 | 7/2012 | Suzuki et al. |
| 8,267,924 B2 | 9/2012 | Zemlok et al. |
| 8,294,399 B2 * | 10/2012 | Suzuki .................. H02P 6/28 |
| | | 318/400.17 |
| 8,303,449 B2 | 11/2012 | Ho et al. |
| 8,316,958 B2 * | 11/2012 | Schell .................. B25F 5/001 |
| | | 173/171 |
| 8,317,350 B2 | 11/2012 | Friedman et al. |
| 8,371,708 B2 | 2/2013 | Nagasaka et al. |
| 8,381,830 B2 | 2/2013 | Puzio et al. |
| 8,415,911 B2 | 4/2013 | Lau et al. |
| 8,430,180 B2 | 4/2013 | Gumpert et al. |
| 8,430,182 B2 | 4/2013 | Soika et al. |
| 8,496,366 B2 | 7/2013 | Leong |
| 8,511,399 B2 | 8/2013 | Kunz |
| 8,528,658 B2 | 9/2013 | Roehm et al. |
| 8,541,914 B2 | 9/2013 | Knight et al. |
| 8,584,770 B2 | 11/2013 | Zhang et al. |
| 8,593,020 B2 | 11/2013 | Chun et al. |
| 8,607,893 B2 | 12/2013 | Kumagai et al. |
| 8,636,081 B2 | 1/2014 | Ludy et al. |
| 8,674,640 B2 * | 3/2014 | Suda .................... B25D 16/006 |
| | | 318/430 |
| 8,708,861 B2 | 4/2014 | Inagaki et al. |
| 8,714,888 B2 | 5/2014 | Bean et al. |
| 8,727,034 B2 | 5/2014 | Leong et al. |
| 8,746,364 B2 | 6/2014 | Atsumi et al. |
| 8,757,286 B2 | 6/2014 | Nagasaka et al. |
| 8,800,679 B2 | 8/2014 | Eshleman et al. |
| 8,820,430 B2 | 9/2014 | Walker et al. |
| 8,939,228 B2 | 1/2015 | Kondo |
| 9,089,954 B2 | 7/2015 | Roehm |
| 9,193,055 B2 | 11/2015 | Lim et al. |
| 9,217,492 B2 | 12/2015 | Kierspe et al. |
| 9,321,156 B2 | 4/2016 | Eshleman et al. |
| 9,385,352 B2 | 7/2016 | Nguyen et al. |
| 9,415,448 B2 | 8/2016 | Schenk et al. |
| 9,463,563 B2 | 10/2016 | Takeuchi et al. |
| 9,566,692 B2 | 2/2017 | Seith et al. |
| 9,579,785 B2 | 2/2017 | Bixler et al. |
| 9,739,366 B2 | 8/2017 | Duerr |
| 9,827,660 B2 | 11/2017 | Blum et al. |
| 9,950,417 B2 | 4/2018 | Ito et al. |
| 10,046,450 B2 | 8/2018 | Bernhart et al. |
| 10,052,733 B2 * | 8/2018 | Ely ..................... B25B 21/02 |
| 10,418,879 B2 | 9/2019 | Bartoszek et al. |
| 10,518,879 B1 * | 12/2019 | Zhang ................ G06K 9/00664 |
| 10,615,670 B2 * | 4/2020 | Madineni ............ B25F 5/02 |
| 2002/0001434 A1 | 1/2002 | Kikinis |
| 2002/0018474 A1 | 2/2002 | Assa et al. |
| 2002/0020538 A1 | 2/2002 | Giardino |
| 2002/0050364 A1 * | 5/2002 | Suzuki ................ B25B 23/1405 |
| | | 173/1 |
| 2002/0096342 A1 | 7/2002 | Milbourne |
| 2002/0108474 A1 | 8/2002 | Adams |
| 2002/0131267 A1 | 9/2002 | Van Osenbruggen |
| 2002/0172035 A1 | 11/2002 | Hara et al. |
| 2002/0185514 A1 | 12/2002 | Adams et al. |
| 2003/0002934 A1 | 1/2003 | Hsu |
| 2003/0121679 A1 | 7/2003 | Taga |
| 2003/0136570 A1 * | 7/2003 | Izumisawa ............ B25B 23/14 |
| | | 173/93.5 |
| 2003/0149508 A1 * | 8/2003 | Watanabe ........... B25B 23/1405 |
| | | 700/168 |
| 2004/0035495 A1 | 2/2004 | Hessenberger et al. |
| 2004/0211573 A1 * | 10/2004 | Carrier ................. B25F 5/00 |
| | | 173/2 |
| 2005/0040206 A1 * | 2/2005 | Adams .................. B25C 1/06 |
| | | 227/131 |
| 2005/0135084 A1 | 6/2005 | Chen et al. |
| 2005/0183870 A1 | 8/2005 | Wada et al. |
| 2005/0224242 A1 | 10/2005 | Britz et al. |
| 2005/0257945 A1 | 11/2005 | Justis |
| 2005/0263304 A1 * | 12/2005 | Sainomoto ........... B25B 21/026 |
| | | 173/2 |
| 2006/0012584 A1 | 1/2006 | Vassallo et al. |
| 2006/0071433 A1 | 4/2006 | Miller |
| 2006/0109246 A1 | 5/2006 | Lee et al. |
| 2006/0118314 A1 | 6/2006 | Aeberhard et al. |
| 2006/0125333 A1 | 6/2006 | Wehner et al. |
| 2006/0185869 A1 * | 8/2006 | Arimura .............. B25B 23/1475 |
| | | 173/176 |
| 2006/0201612 A1 | 9/2006 | Lin |
| 2006/0226718 A1 | 10/2006 | Yang |
| 2006/0237205 A1 | 10/2006 | Sia et al. |
| 2006/0243469 A1 | 11/2006 | Webster |
| 2007/0000676 A1 * | 1/2007 | Arimura ................ B25B 21/02 |
| | | 173/179 |
| 2007/0180959 A1 | 8/2007 | Tokunaga et al. |
| 2007/0193762 A1 | 8/2007 | Arimura et al. |
| 2007/0222310 A1 | 9/2007 | Drexlmaier |
| 2007/0256847 A1 | 11/2007 | Wan et al. |
| 2008/0000665 A1 | 1/2008 | Kokinelis et al. |
| 2008/0025017 A1 | 1/2008 | Tadokoro |
| 2008/0032848 A1 | 2/2008 | Ho |
| 2008/0048650 A1 | 2/2008 | Islam et al. |
| 2008/0122302 A1 | 5/2008 | Leininger |
| 2009/0098971 A1 | 4/2009 | Ho et al. |
| 2009/0188688 A1 | 7/2009 | Gumpert et al. |
| 2009/0200053 A1 * | 8/2009 | Scrimshaw ........... B23B 31/123 |
| | | 173/47 |
| 2009/0221222 A1 | 9/2009 | Lo et al. |
| 2009/0308624 A1 * | 12/2009 | Shibata ............... B25B 23/1405 |
| | | 173/1 |
| 2010/0163261 A1 | 7/2010 | Tomayko et al. |
| 2010/0175902 A1 * | 7/2010 | Rejman ................ B25D 16/006 |
| | | 173/1 |
| 2010/0200380 A1 | 8/2010 | Staas et al. |
| 2010/0252287 A1 * | 10/2010 | Morimura ............. B25B 21/02 |
| | | 173/1 |
| 2010/0263890 A1 * | 10/2010 | Profunser ............. B25B 21/02 |
| | | 173/1 |
| 2010/0282482 A1 * | 11/2010 | Austin ............. G05B 19/41805 |
| | | 173/2 |
| 2010/0307782 A1 * | 12/2010 | Iwata ...................... B25F 5/00 |
| | | 173/1 |
| 2010/0326686 A1 | 12/2010 | Leong et al. |
| 2011/0000688 A1 * | 1/2011 | Iwata ...................... B25B 21/00 |
| | | 173/1 |
| 2011/0024144 A1 * | 2/2011 | Usselman ............. B25D 17/24 |
| | | 173/1 |
| 2011/0036605 A1 | 2/2011 | Leong et al. |
| 2011/0048750 A1 | 3/2011 | Leong et al. |
| 2011/0056715 A1 * | 3/2011 | Vanko ...................... B25F 5/00 |
| | | 173/176 |
| 2011/0079407 A1 * | 4/2011 | Iimura ................ B25B 23/1475 |
| | | 173/2 |
| 2011/0109093 A1 | 5/2011 | Leininger |
| 2011/0127059 A1 | 6/2011 | Limberg et al. |
| 2011/0132630 A1 * | 6/2011 | Kawamura ............. B25B 21/00 |
| | | 173/178 |
| 2011/0147028 A1 * | 6/2011 | Iwashita ................ H02P 23/14 |
| | | 173/176 |
| 2011/0147029 A1 * | 6/2011 | Roehm ................. B25B 23/141 |
| | | 173/176 |
| 2011/0180290 A1 * | 7/2011 | Kondo ................. B25B 21/008 |
| | | 173/176 |
| 2011/0188232 A1 | 8/2011 | Friedman et al. |
| 2011/0203819 A1 * | 8/2011 | Tsai ...................... B25B 21/00 |
| | | 173/1 |
| 2011/0248650 A1 | 10/2011 | Sterling et al. |
| 2011/0284256 A1 * | 11/2011 | Iwata ...................... B25F 5/00 |
| | | 173/176 |
| 2011/0308827 A1 * | 12/2011 | Kaufmann ............ B25B 23/14 |
| | | 173/1 |
| 2011/0315417 A1 * | 12/2011 | Matsunaga ............ B25B 23/14 |
| | | 173/176 |
| 2012/0013829 A1 | 1/2012 | Song et al. |

(56) References Cited

U.S. PATENT DOCUMENTS

| | | | |
|---|---|---|---|
| 2012/0055690 A1* | 3/2012 | Uemura | B25B 23/1453 173/177 |
| 2012/0090863 A1* | 4/2012 | Puzio | B25B 21/02 173/2 |
| 2012/0132449 A1 | 5/2012 | Hecht et al. | |
| 2012/0138329 A1 | 6/2012 | Sun et al. | |
| 2012/0175142 A1 | 7/2012 | Van Der Linde et al. | |
| 2012/0205131 A1 | 8/2012 | Furusawa et al. | |
| 2012/0234568 A1 | 9/2012 | Schnell et al. | |
| 2012/0273242 A1* | 11/2012 | Eshleman | B25B 21/00 173/1 |
| 2012/0279736 A1* | 11/2012 | Tanimoto | B25B 23/1475 173/2 |
| 2012/0292071 A1 | 11/2012 | Su et al. | |
| 2012/0292472 A1 | 11/2012 | Segura et al. | |
| 2012/0318544 A1 | 12/2012 | Sun et al. | |
| 2012/0318549 A1 | 12/2012 | Nagasaka et al. | |
| 2013/0014967 A1* | 1/2013 | Ito | B25F 5/021 173/93 |
| 2013/0033217 A1 | 2/2013 | Hirabayashi | |
| 2013/0056236 A1* | 3/2013 | Morinishi | B23P 19/066 173/176 |
| 2013/0062086 A1* | 3/2013 | Ito | B25B 23/1405 173/1 |
| 2013/0062088 A1* | 3/2013 | Mashiko | B25B 21/02 173/2 |
| 2013/0062498 A1 | 3/2013 | Ito et al. | |
| 2013/0068491 A1* | 3/2013 | Kusakawa | B25B 21/00 173/176 |
| 2013/0075121 A1 | 3/2013 | Nakamura et al. | |
| 2013/0087355 A1 | 4/2013 | Oomori et al. | |
| 2013/0105189 A1* | 5/2013 | Murthy | B25B 21/00 173/178 |
| 2013/0108385 A1* | 5/2013 | Woelders | B23B 45/00 408/6 |
| 2013/0126202 A1 | 5/2013 | Oomori et al. | |
| 2013/0133912 A1* | 5/2013 | Mizuno | B25B 23/1405 173/180 |
| 2013/0153252 A1* | 6/2013 | Sakakibara | B25B 21/008 173/1 |
| 2013/0153253 A1 | 6/2013 | Ludy et al. | |
| 2013/0161040 A1 | 6/2013 | Tomayko et al. | |
| 2013/0175066 A1 | 7/2013 | Zhang et al. | |
| 2013/0186661 A1* | 7/2013 | Okubo | B25D 11/005 173/2 |
| 2013/0186666 A1* | 7/2013 | Yoshino | B25B 23/1475 173/176 |
| 2013/0193891 A1 | 8/2013 | Wood et al. | |
| 2013/0206434 A1* | 8/2013 | Braun | B25D 17/043 173/2 |
| 2013/0206435 A1 | 8/2013 | Papp | |
| 2013/0213680 A1 | 8/2013 | Chen | |
| 2013/0220655 A1 | 8/2013 | Tomayko | |
| 2013/0228353 A1* | 9/2013 | Chen | B25B 23/1475 173/1 |
| 2013/0228356 A1 | 9/2013 | Hayes et al. | |
| 2013/0240230 A1* | 9/2013 | Saur | B25B 21/00 173/178 |
| 2013/0247706 A1 | 9/2013 | Duerr | |
| 2013/0267374 A1 | 10/2013 | Blum et al. | |
| 2013/0269961 A1 | 10/2013 | Lim et al. | |
| 2013/0270932 A1 | 10/2013 | Hatfield et al. | |
| 2013/0270934 A1 | 10/2013 | Smith et al. | |
| 2013/0274797 A1 | 10/2013 | Nicholas et al. | |
| 2013/0284480 A1 | 10/2013 | Horie et al. | |
| 2013/0292147 A1 | 11/2013 | Mergener et al. | |
| 2013/0313925 A1 | 11/2013 | Mergener et al. | |
| 2013/0327552 A1 | 12/2013 | Lovelass et al. | |
| 2013/0333904 A1* | 12/2013 | Raggl | B25D 11/064 173/1 |
| 2013/0333910 A1* | 12/2013 | Tanimoto | B25B 21/02 173/176 |
| 2013/0342084 A1 | 12/2013 | Su | |
| 2014/0026723 A1 | 1/2014 | Persson et al. | |
| 2014/0036482 A1 | 2/2014 | Vanko et al. | |
| 2014/0069676 A1 | 3/2014 | Abante et al. | |
| 2014/0096985 A1* | 4/2014 | Chu | B25B 21/02 173/1 |
| 2014/0100687 A1 | 4/2014 | Ekstrom et al. | |
| 2014/0102741 A1* | 4/2014 | Sekino | B25B 21/02 173/181 |
| 2014/0138111 A1 | 5/2014 | Takeuchi et al. | |
| 2014/0158390 A1 | 6/2014 | Mashiko et al. | |
| 2014/0166326 A1* | 6/2014 | Le Du | B25B 21/02 173/181 |
| 2014/0182869 A1 | 7/2014 | Kumagai et al. | |
| 2014/0182870 A1 | 7/2014 | Herr | |
| 2014/0209342 A1 | 7/2014 | Chen | |
| 2014/0290973 A1 | 10/2014 | Lin | |
| 2014/0338503 A1 | 11/2014 | Beer et al. | |
| 2014/0365012 A1* | 12/2014 | Chen | B25B 21/02 700/275 |
| 2014/0367134 A1* | 12/2014 | Phillips | B25B 21/00 173/176 |
| 2015/0014010 A1 | 1/2015 | Chang | |
| 2015/0041163 A1* | 2/2015 | McClung | B25B 21/026 173/1 |
| 2015/0047866 A1* | 2/2015 | Sakai | B25F 5/00 173/179 |
| 2015/0047943 A1 | 2/2015 | Park | |
| 2015/0122521 A1* | 5/2015 | Chen | B25B 21/02 173/1 |
| 2015/0122523 A1 | 5/2015 | Yamamoto et al. | |
| 2015/0122524 A1 | 5/2015 | Papp | |
| 2015/0129248 A1 | 5/2015 | Nitsche et al. | |
| 2015/0136433 A1* | 5/2015 | Nitsche | B25D 16/006 173/2 |
| 2015/0144365 A1* | 5/2015 | Hirabayashi | B25B 23/1405 173/2 |
| 2015/0151424 A1 | 6/2015 | Elder et al. | |
| 2015/0171654 A1* | 6/2015 | Horie | B25F 5/00 173/2 |
| 2015/0197003 A1 | 7/2015 | Lin et al. | |
| 2015/0202759 A1 | 7/2015 | Wang | |
| 2015/0209948 A1 | 7/2015 | Hecht et al. | |
| 2015/0328760 A1 | 11/2015 | Ikuta et al. | |
| 2015/0336249 A1* | 11/2015 | Iwata | B25B 21/02 173/1 |
| 2016/0102762 A1 | 4/2016 | Brennenstuhl et al. | |
| 2016/0131353 A1 | 5/2016 | Bartoszek | |
| 2016/0176027 A1 | 6/2016 | Aoyagi | |
| 2016/0250738 A1* | 9/2016 | Leh | B25B 21/02 173/176 |
| 2016/0311094 A1* | 10/2016 | Mergener | B25B 23/1475 |
| 2016/0354889 A1* | 12/2016 | Ely | B25F 5/00 |
| 2016/0354905 A1* | 12/2016 | Ely | B25B 21/02 |
| 2016/0354915 A1* | 12/2016 | Bartoszek | B25F 5/02 |
| 2017/0225309 A1 | 8/2017 | Meyer | |
| 2018/0161951 A1 | 6/2018 | Billings et al. | |

FOREIGN PATENT DOCUMENTS

| | | |
|---|---|---|
| CN | 101253015 A | 8/2008 |
| CN | 103481251 A | 1/2014 |
| CN | 103989497 A | 8/2014 |
| CN | 104162880 A | 11/2014 |
| CN | 104676315 | 6/2015 |
| DE | 19518591 | 12/1996 |
| DE | 102004051913 A1 | 2/2006 |
| DE | 102005015900 A1 | 2/2006 |
| DE | 202006018761 U1 | 2/2007 |
| DE | 102006000543 A1 | 6/2008 |
| DE | 102008020173 A1 | 10/2009 |
| DE | 102012211914 A1 | 10/2013 |
| DE | 202016104126 U1 | 8/2016 |
| EP | 0271903 | 6/1988 |
| EP | 0585541 | 5/1993 |
| EP | 0585541 A3 | 11/1994 |
| EP | 0585541 B1 | 9/1997 |
| EP | 911119 A2 | 4/1999 |
| EP | 1426989 A1 | 6/2004 |

(56) References Cited

FOREIGN PATENT DOCUMENTS

| | | |
|---|---|---|
| EP | 1524085 A2 | 4/2005 |
| EP | 1595649 A2 | 11/2005 |
| EP | 1595650 A2 | 11/2005 |
| EP | 1867438 A2 | 12/2007 |
| EP | 2075094 | 12/2007 |
| EP | 1943061 A2 | 7/2008 |
| EP | 1982798 A2 | 10/2008 |
| EP | 1207016 B1 | 1/2009 |
| EP | 2042271 A2 | 4/2009 |
| EP | 2062670 A2 | 5/2009 |
| EP | 2062700 A2 | 5/2009 |
| EP | 1524084 B1 | 8/2009 |
| EP | 1447177 B1 | 4/2011 |
| EP | 2256899 B1 | 8/2011 |
| EP | 2184138 A3 | 12/2011 |
| EP | 2524775 A2 | 11/2012 |
| EP | 2535150 A2 | 12/2012 |
| EP | 2650085 A2 | 10/2013 |
| EP | 2687338 A1 | 1/2014 |
| GB | 752251 A | 7/1956 |
| GB | 1068990 | 5/1967 |
| GB | 1413293 A | 11/1975 |
| GB | 2396390 A | 6/2004 |
| GB | 2514261 A | 11/2014 |
| JP | 8193896 A | 7/1996 |
| JP | 8294878 A | 11/1996 |
| JP | 2000218561 A | 8/2000 |
| JP | 2002331427 A | 11/2002 |
| JP | 2002331427 A | 11/2002 |
| JP | 2004202600 A | 7/2004 |
| JP | 2004239681 A | 8/2004 |
| JP | 2005254400 A | 9/2005 |
| JP | 2006272488 A | 10/2006 |
| JP | 2006312210 A | 11/2006 |
| JP | 2009269137 A | 11/2009 |
| JP | 2010012585 A | 1/2010 |
| JP | 2011-230272 | 4/2010 |
| JP | 2011031369 A | 2/2011 |
| JP | 2011067910 A | 4/2011 |
| JP | 2012035358 A | 2/2012 |
| JP | 2012149669 A | 8/2012 |
| RU | 2360786 C2 | 7/2009 |
| TW | 2012/31843 | 8/2012 |
| WO | WO1998053959 A1 | 12/1998 |
| WO | WO2000064639 A1 | 11/2000 |
| WO | WO2001044776 A1 | 6/2001 |
| WO | 0154865 A2 | 8/2001 |
| WO | WO0230624 | 4/2002 |
| WO | 02058891 A1 | 8/2002 |
| WO | WO2004029569 A1 | 4/2004 |
| WO | WO2009011633 A1 | 1/2009 |
| WO | WO2010110716 A1 | 9/2010 |
| WO | 2011/013852 A1 | 2/2011 |
| WO | 2011013852 A1 | 2/2011 |
| WO | WO2011099487 A1 | 8/2011 |
| WO | WO2011102559 A1 | 8/2011 |
| WO | WO2012002578 A1 | 1/2012 |
| WO | WO2012023452 A1 | 2/2012 |
| WO | WO2013/037325 | 3/2013 |
| WO | WO 2013164905 | 11/2013 |
| WO | WO 2013/183535 | 12/2013 |
| WO | 2014098256 A1 | 6/2014 |
| WO | WO2014/108110 | 7/2014 |
| WO | WO2014/124859 | 8/2014 |
| WO | 2016196899 A1 | 12/2016 |

OTHER PUBLICATIONS

International Search Report dated Sep. 6, 2016; PCT/US2016/035681; Filing Date Jun. 3, 2016.
International Search Report dated Aug. 26, 2016; PCT/US2016/035665; Filing Date Jun. 3, 2016.
International Search Report dated Sep. 14, 2016; PCT/US2016/035674; Filing Date Jun. 3, 2016.
International Search Report dated Sep. 2, 2016; PCT/US2016/035797; Filing Date Jun. 3, 2016.
International Search Report dated Aug. 31, 2016; PCT/US2016/035698; Filing Date Jun. 3, 2016.
Office Action dated Oct. 6, 2017; U.S. Appl. No. 15/172,247.
CN 104676315 Dated Jun. 3, 2015, Chou; English Translation.
Clipstrip™ Aqua—Waterproof & Rechargeable LED Strip Light, from: http://www.cliplight.com/automotive/lighting/compact-series/clipstrip-aqua/;Dated Sep. 10, 2014.
ATD Tools 80335 35W Cob LED Worklight w/Stand, from: https://www.google.com/shopping/product/16993246027546592360?q=COB+LED+flashlight&espv= 2&biw=1680&bih=949&bav=on.2 ;Dated Sep. 10, 2014.
3W Portable Rechargeable LED Work Light with Magnetic Base Power Car Charger, from: http://www.ebay.com/itm/like/141277021128?1pid=82 ; Dated Sep. 10, 2014.
ATD 80304 Saber 3Watt Cob LED Strip Light Plus 2.4watt Top Light, from: https://www.google.com/shopping/product/38191055578222370488?q=COB+LED+flashlight&espv=2&biw=1680&bih=94 9&bav=on.2 ; Dated Sep. 10, 2014.
Ac85-265v Or Dc12v/24v Epistar Cob Led Chip Led Work Flashlight, from: http://www.alibaba.com/product-detail/AC85-265v-or-dc12v-24v-epistar_ 1450867344.html ; Dated Sep. 10, 2014.
Hot Sell High Brightness Cob Flashlight, from http://www.alibaba.com/product-detail/Hot-sell-high-brightn ess-COB-Flashlight_1850789033.html; Dated Sep. 10, 2014.
Makita Flashlight, ML140, 14.4V, from http://www.globalindustrial.com/p/tools/portable-work-lights/Flashl ights-Handheld/flashlight-ml1140-144 v ; Dated Sep. 10, 2014.
Laser-Flex 2D by Penn Tool Co.; Retrieved on Sep. 2, 2014 from: http://www.penntoolco.com/catalog/products/ products.cfm?categoryID=1351 ; Dated Sep. 2, 2014.
PELICAN Remote Area Lighting; Retrieved on Sep. 2, 2014 from: http://www.grainger.com/product/PELICAN-Remot e-Area-Lighting-System—5RZY8?s_pp=false&picUrl=//static.grainger.com /rp/s/is/image/Grainger/5RZY8_AS01? $smthumb$ ; Dated Sep. 2, 2014.
SYCLONE by Streamlight; Retrieved on Sep. 2, 2014 from: http://www.smokesign.com/syrefl.html ; Dated Sep. 2, 2014.
Ace LED Work Light with Stand; Retrieved on Sep. 2, 2014 from: http://www.acehardware.com/product/index.jsp ?productId=19607576 ; Dated Sep. 2, 2014.
Zoro LED Worklight by Cooper; Retrieved on Sep. 2, 2014 from: http://www.zoro.com/i/G4585287/?utm_source=g oogle_shopping&utm_medium=cpc&utm_campaign=Google_Shopping_Feed&gclid= CPm46JHwwsACFRMLMgod_H8AyA ; Dated Sep. 2, 2014.
Jimmy Houston Folding Flip Light; Retrieved on Sep. 2, 2014 from: http://www.walmart.com/ip/205122797?wmlsp artner-wlpa&adid=22222222227014895251&w10=&w11=g&w12=c&w13=40969534952 &w14=&w15=pla&w16=78912422192&veh=sem#ProductDetail ; Dated Sep. 2, 2014.
"LifeBox Series by Streamlight"; Retrieved on Sep. 2, 2014 from: http://www.streamlight.com/en-ca/product/c lass.html?cid=6 ; Dated Sep. 2, 2014.
Dial a Speed; Taken from the Internet on Aug. 29, 2014 from http://makezine.com/projects/the-dial-a-spee d/.
Festool RO 90 DX; Taken from the Internet on Aug. 29, 2014 from http://www.thewoodnerd.com/reviews/festo o1RO90DX.html.
2145QiMax 3/4 Air Impactool "Maximum Impact"; Ingersoll-Rand, Aug. 26, 2014.
"Air Impact Wrench 588A1 Maintenance Information"; Ingersoll-Rand, Nov. 1, 2007.
Partial International Search Report dated Jan. 18, 2019; EP 16804555.7; Filing Date Jun. 3, 2018.
Supplementary European Search Report dated May 2, 2019; EP 16804555; Filing Date Jun. 3, 2016.
Office Action/Search Report dated Dec. 6, 2018; CN 201680031738.1; Filing Date Jun. 3, 2016.
Examination Report for European Application No. 16804555.7, dated Feb. 2, 2021.
Examination Report for European Application No. 16804498.8, dated May 29, 2019.

(56) References Cited

OTHER PUBLICATIONS

Extended European Search Report for European Application 16804509.4, dated Feb. 20, 2019.
Extended European Search Report for European Application No. 16804498.0, dated Sep. 25, 2018.
Extended European Search Report for European Application No. EP 16804517.7, dated Dec. 4, 2018.
Office Action for Chinese Application No. 201680031397.8, dated Dec. 5, 2018.
Office Action for Chinese Application No. 201680031488.1, dated Dec. 11, 2018.
Office Action for Chinese Application No. 201680031710.8, dated Dec. 18, 2018.
Office Action for Chinese Patent Application No. 201680031739.6, dated Nov. 20, 2020.
Office Action for Chinese Patent Application No. 201680031740.9, dated Nov. 23, 2020.
Supplemental European Search Report for European Application 16804550, dated Dec. 19, 2018.
Supplementary European Search Report for European Application No. 16804505, dated Jan. 28, 2018.
Examination Report for European Application No. 16804555.7, dated Feb. 1, 2022.
Examination Report for European Application No. 16804555.7, dated Sep. 7, 2021.

\* cited by examiner

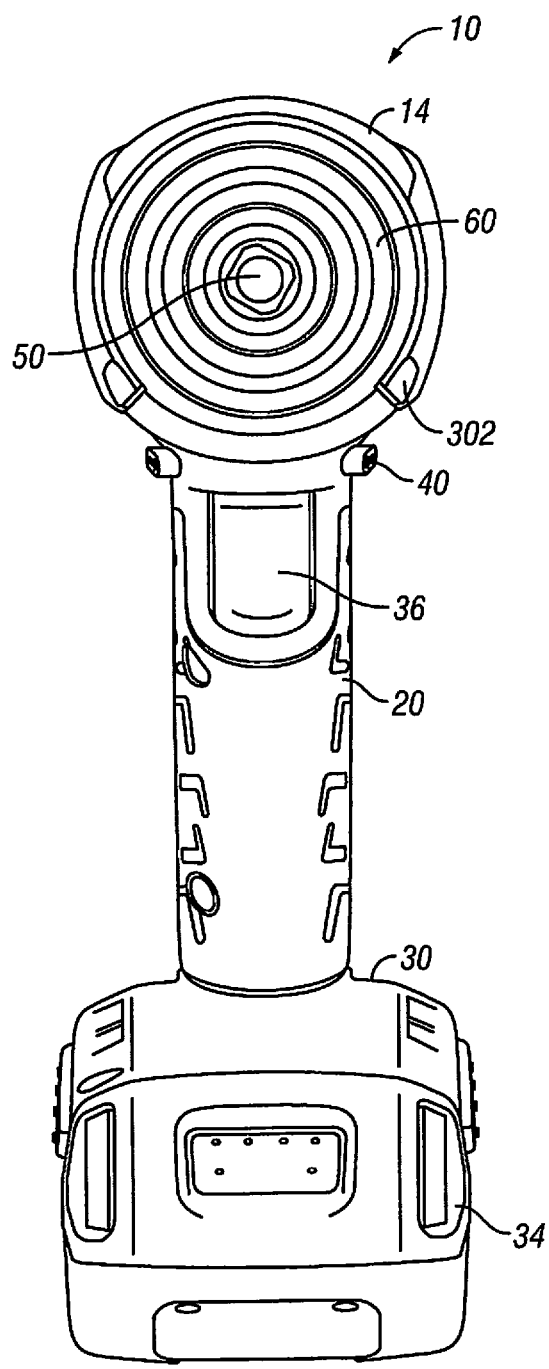
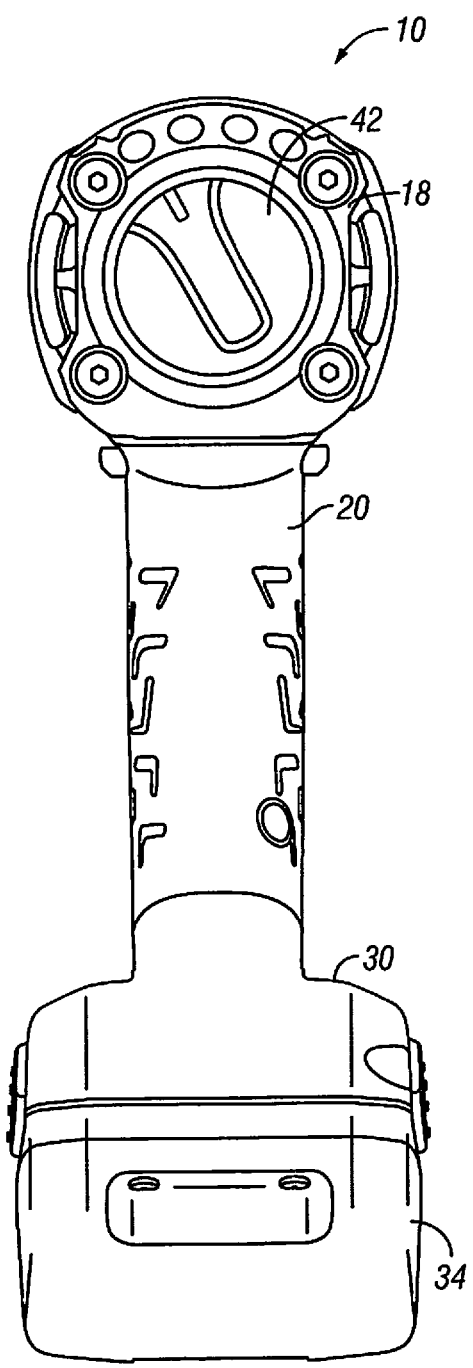
FIG. 3  FIG. 4

POWER TOOLS WITH USER-SELECTABLE OPERATIONAL MODES

RELATED APPLICATIONS

The present application relates to and claims priority to U.S. Provisional Patent Application, Ser. No. 62/171,504, filed on Jun. 5, 2015, entitled "Power Tools with User-Selectable Operational Modes." The subject matter disclosed in that provisional application is hereby expressly incorporated into the present application.

TECHNICAL FIELD AND SUMMARY

The present disclosure relates, generally, to power tools and, more particularly, to power tools with various user-selectable operational modes.

Power tools (e.g., impact tools) typically include a trigger designed to be operated by a user to control the amount of power delivered to a motor of the power tool and, hence, the amount of motive force delivered by the motor to an output spindle of the power tool. Many power tools on the market today rely solely on the user to actively adjust the speed and duration of run time of the tool by manipulating the trigger.

In contrast, an illustrative embodiment of the present disclosure provides a hand-held power tool which comprises a housing assembly, an output spindle, a motor endbell, and a controller. The housing assembly supports an electric motor having a rotor configured to rotate when the electric motor is supplied with power. The output spindle protrudes from an output end of the housing assembly, and is functionally coupled to the rotor such that the output spindle rotates in response to a rotation of the rotor. The motor endbell is located on the housing assembly adjacent the electric motor and opposite the output spindle. The controller is operable to determine phases of a fastening operation in which the hand-held power tool is operating. The phases of the fastening operation of the hand-held power tool comprise two phases including: (1) a continuous run phase and (2) an impacting phase. The continuous run phase is characterized by a first rotational speed, continuous rotation, and low output torque of the output spindle until the output spindle experiences a threshold rotational resistance from a fastener being rotated by the hand-held power tool. The impacting phase begins once the threshold rotational resistance from a fastener being rotated by the hand-held power tool occurs. The impacting phase is characterized by the output spindle experiencing intermittent rotations at a second rotational speed that is a lower speed than the first rotational speed, and is at a higher output torque.

In the above and other embodiments of the present disclosure may also comprise: the phases of the fastening operation are determined by a current drawn by the electric motor, and wherein during the impacting phase, the motor draws more current than during the continuous run phase; the phases of the fastening operation are determined by the controller from the group consisting of at least one of detects a speed of rotation of the electric motor using an electromagnetic field from the electric motor, monitors output of an encoder positioned adjacent the rotor of the electric motor, monitors output of a resolver positioned on the rotor, and monitors output of at least one Hall-effect sensor positioned in proximity to rotor magnets on the electric motor; the phases of the fastening operation are determined from the group consisting at least one of the controller identifies deceleration of the rotor of the electric motor due to an increased motor load, an electric motor drive identifies an abrupt change in motor torque by monitoring control loop error values; the controller monitors battery voltage; the controller monitors output signals of a microphone positioned in the hand-held power tool such that when a predetermined noise is generated by an impact mechanism in the hand-held power tool and is detected by the microphone the output signals are sent to the controller, a sensor located adjacent the impact mechanism to determine if a hammer has moved wherein the sensor is selected from the group consisting of a Hall-effect sensor, a linear variable differential transformer (LVDT), and a microswitch, and a torque sensor installed between the electric motor and the impact mechanism to measure a torque increase to indicate impacting; at least one sensor to monitor the phases of the fastening operation selected from the group consisting of an anvil angle encoder, a hammer angle sensor, a hammer axial travel sensor, an accelerometer on a hammer, a motor brush bounce sensor configured to detect interruptions caused when a brush leaves a commutator of the electric motor, a cone clutch integrated into a front location on the hand-held power tool configured to begin slipping at a preset torque, and a sensor to detect torsional vibrations to determine a socket angle; the power to the electric motor is based on the phases of the fastening operation and a plurality of operation modes; during the impacting phase, the motor draws more current than during the continuous run phase such that after an initial spike in the current supplied to the electric motor when the electric motor begins rotating less current than the initial spike is applied to the electric motor to maintain a constant speed, wherein once impacting has begun the current applied to the electric motor increases while the load applied to the electric motor increases; and the electric motor is a brushless DC motor, wherein the controller switches power on and off through windings of the brushless DC motor to monitor a rotational position or speed of the brushless DC motor.

Another illustrative embodiment of the present disclosure provides a hand-held power tool which comprises a housing assembly, an output spindle, an electric motor, a motor endbell, and a user interface. The housing assembly supports the electric motor having a rotor configured to rotate when the electric motor is supplied with power. The output spindle protrudes from an output end of the housing assembly. The output spindle is functionally coupled to the rotor such that the output spindle rotates in response to a rotation of the rotor. The motor endbell is located on the housing assembly adjacent the electric motor and opposite the output spindle. The user interface configured to select one of a plurality of operation modes of the hand-held power tool which control the power supplied to the electric motor based on phases of a fastening operation of the hand-held power tool. These phases of the fastening operations are selected from the group consisting of a continuous run phase and an impacting phase.

In the above and other embodiments of the present disclosure may also comprise: the continuous run phase being characterized by a first rotational speed, continuous rotation, and low output torque until the output spindle experiences a threshold rotational resistance from a fastener being rotated by the hand-held power tool, wherein the impacting phase begins once the threshold rotational resistance from the fastener being rotated by the hand-held power tool occurs, and wherein the impacting phase is characterized by the output spindle experiencing intermittent rotations at a second rotational speed that is a lower speed than the first rotational speed, and is at a higher output torque; a first operation mode of the plurality of operation modes is a standard mode, such that full power is delivered to the electric motor during the continuous run phase and the impact phase; a second operation mode of the plurality of operation modes being a reduced power mode, such that full power being delivered to the electric motor during the continuous run phase and less than the full power being delivered to the electric motor during the impact phase; when in the reduced power mode and when the hand-held power tool impacts, the current through the electric motor rises which indicates to the controller that the impacting phase has begun and reduces the power delivered to the electric motor; a third operation mode of the plurality of operation modes being a torque stick stability mode, such that the controller being configured to avoid operating speeds that create oscillations in the hand-held power tool that cause the hand-held power tool to vibrate; a fourth operation mode of the plurality of operation modes being a snug-up mode, such that the controller maintains the electric motor operating for a predetermined amount of time after a rise in current being detected by the controller indicating that the hand-held power tool has entered the impacting phase, and wherein the predetermined amount of time being determined by an internal clock of the controller; during the snug-up mode the controller keeps the electric motor operating for a predetermined amount of time at a predetermined speed during the continuous run phase, and wherein the predetermined speed is less than full speed of the electric motor; the fastening speed of the hand-held power tool being maintained during run-down, while final torque is applied to a fastener by the hand-held power tool is limited; the plurality of operation modes are user-selectable operational modes; a fifth operation mode of the plurality of operation modes being a snug-up soft mode, such that rotating the output spindle at full speed during the continuous run phase being followed by impacting the output spindle at a reduced power for a fixed amount of time during the impacting phase; the plurality of operation modes are configured to include a number of impacts in a reverse direction after any one of the plurality of operation modes has concluded operation; one operation mode of the plurality of operation modes includes a low torque that stays in the continuous run phase and not the impacting phase; the plurality of operation modes include a cross thread mode where, at a start of the continuous run phase, the output spindle rotates at the first rotational speed for a predetermined duration before accelerating to a second speed; and the user interface being operable to select the plurality of operational modes being a rotational knob positioned on a rear portion of the hand-held power tool, and the rotational knob being locatable at one or more positions that correspond to the plurality of operation modes.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

FIG. 3 is a front elevation view of the power tool of FIG. 1;

FIG. 4 is a rear elevation view of the power tool of FIG. 1;

DETAILED DESCRIPTION OF THE DRAWINGS

Figure 1:
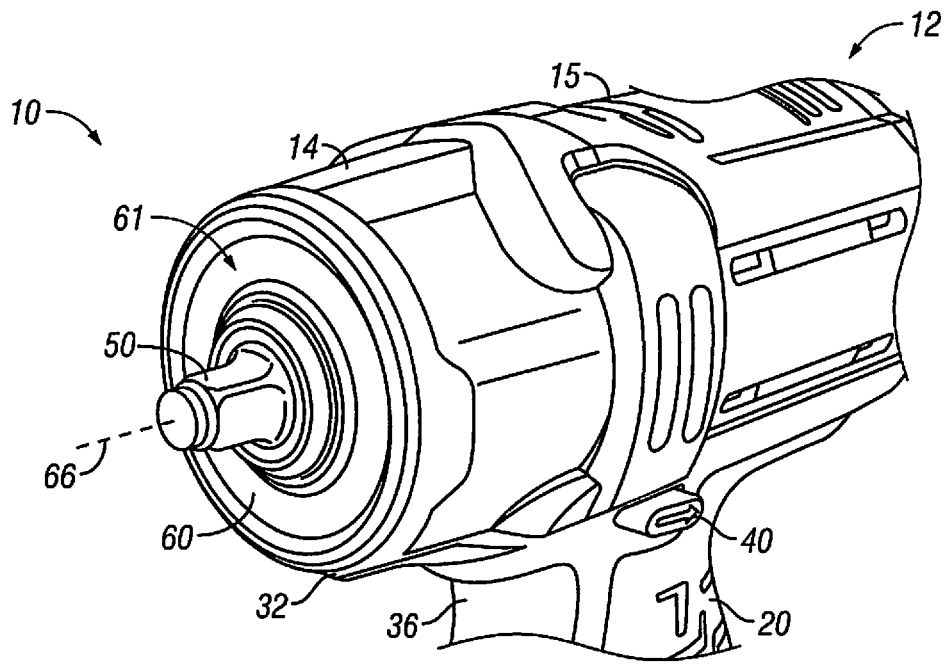
FIG. 1 is a perspective view of one illustrative embodiment of a power tool.
Figure 2:
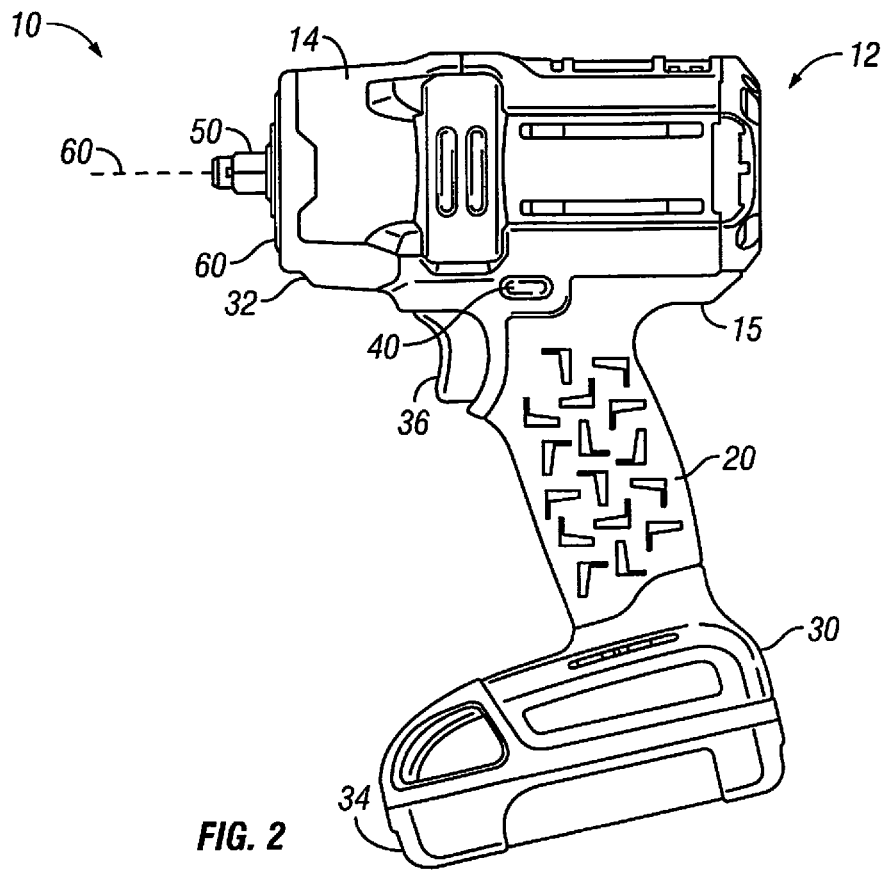
FIG. 2 is a side elevation view of the power tool of FIG. 1.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention.

FIGS. 1-5 illustrate one embodiment of a power tool 10, more particularly an impact tool 10, that includes a housing 12 and a hammer case 14. The housing 12 includes a motor housing 15, a handle 20, and a power source housing 30, among other components. The motor housing 15 encloses a motor 38 (see FIG. 5) configured to provide a motive force and a gear assembly 72 (see FIG. 5) configured to translate the motive force from motor 38 to an output spindle 50 of the power tool 10. In the illustrative embodiment, the handle 20 extends between the motor housing 15 and power source housing 30 and is configured to be graspable by a user of the power tool 10. Power source housing 30 is coupled to an end of the handle 20 opposite the motor housing 15 and is configured to connect to a power source 34 (see FIG. 2), for example, a battery or a source of motive fluid, such as compressed air. In the illustrative embodiment, the power tool 10 is an electric impact tool, which is powered by a battery removably coupled to the power source housing 30. In the illustrative embodiment, the motor 38 is an electric motor, more particularly a brushless direct-current (DC) motor.

In the illustrative embodiment, the power tool 10 also includes a controller 70 supported in the housing 12 (see FIG. 5), connected to the power source 34, and configured to manage a plurality of processes associated with the operation of the power tool 10. In some embodiments, the controller 70 includes a processor, memory, an input/output subsystem, and other components as might be necessary to perform the functions disclosed herein. The controller may be embodied as any type of electronics capable of implementing digital logic. The memory may be configured as a read-only memory (ROM), a random access memory (RAM), a flash memory, or an electronically-erasable programmable ROM (EEPROM).

The housing 12 as shown in FIGS. 1, 2, 3, and 4, includes a number of user-selectable input devices (e.g., triggers, switches, and knobs) configured to allow the user to adjust one or more user selectable features of the power tool 10. For instance, the housing 12 includes a trigger 36 positioned on the handle 20 near the motor housing 15, such that trigger 36 may be operated by a user grasping the handle 20 of the power tool 10. In many power tools, the primary function of the trigger is to control the motive force delivered by the motor to the output spindle. Trigger 36 is spring loaded and will default to keeping the power tool 10 powered off. As the user pulls trigger 36, power is delivered from the power source 34 to motor 38 causing motor 38 to rotate. In some embodiments, trigger 36 may include many positions, such that the more the trigger is depressed, the more power is delivered to motor 38 and the faster motor 38 rotates.

For example, in a normal operation mode of the power tool 10, if the trigger 36 is fully depressed by the user, motor 38 will cause output spindle 50 to rotate with full power. In another example, in a normal operation mode, if trigger 36 is only partially depressed by the user, motor 38 will supply less than full power to the output spindle 50. In some embodiments, trigger 36 may also be used to control other features of the power tool 10, such as the operation of a headlight or lighting unit 60 of power tool 100. For example, depressing trigger 36 may turn on lighting unit 60 of power tool 10 and supply power to motor 38 causing motor 38 to turn and produce a motive force. In some embodiments, if trigger 36 is only partially depressed lighting unit 60 of power tool 10 will turn on, but motor 38 of the power tool 10 will not rotate, thereby allowing the user to illuminate the work space of power tool 10 before operating power tool 10.

Housing 12 also includes a Forward/Neutral/Reverse switch 40 ("F/N/R switch") positioned in housing 12 to be adjustable by the user of power tool 10. In the illustrative embodiment, the F/N/R switch 40 is positioned in handle of the power tool 10 near trigger 36 and near motor housing 15. The illustrative embodiment of the F/N/R switch 40 includes a forward position, a neutral position, and reverse position. The forward position is configured to cause motor 38 to rotate in a forward direction when trigger 36 is depressed. The reverse position is configured to cause motor 38 to rotate in a backward, or reverse, direction when trigger 36 is depressed. The neutral position disconnects trigger 36 from motor 38, such that even if trigger 36 is depressed motor 38 will not rotate.

Housing 12 also includes a rotary knob 42 positioned on a rear portion 18 of the housing 12, such that knob 42 faces the user during normal operation of the power tool 10. Rotary knob 42 is configured to allow the user to select one of a plurality of modes of operation of the power tool 10. When knob 42 is rotated, it passes through a plurality of detents (not shown) that correspond to respective modes of operation. In some embodiments, knob 42 includes spring loaded features that engage with the respective detent features of the power tool 10. The spring loaded features on knob 42 may be "leaf spring" type features that are integral to the knob or may be a plurality of components to create a spring loaded feature set (e.g., a sliding plunger preloaded by a coil spring not shown, but disclosed in Provisional Patent Application No. 62/171,706, titled 'Power Tool User Interfaces;" the disclosure of which is herein incorporated by reference in its entirety). Housing 12 may also have a plurality of grooves to accept the spring loaded features on knob 42 to create the necessary detents that correspond to rotary positions of knob 42. In another embodiment, the detent grooves may be incorporated into the rear surface of the electric motor which is adjacent to knob 42. In yet another embodiment, the spring loaded features may be integrated into the tool housing or the rear surface of the motor, and the detent grooves may be integrated into the knob. In the illustrative embodiment, each detented rotary position of the knob corresponds to a respective operational mode of the power tool 100.

Power tool 10 may include user output devices 86 (see FIG. 5), such as indicator lights, to indicate the operational parameters of the power tool 10. In some embodiments, chip-on-board (COB) light emitting diodes (LEDs) are used as indicator lights to provide feedback to the user about the operating conditions of the power tool 10. The feedback provided by such indicator lights may include a battery charge level, an operational mode selected, a reminder to perform maintenance, a fault indication, or an indication of completion of fastening. The COB LEDs may also provide non-functional aesthetic lighting in the power tool 10. The COB LEDs may light up in different colors and/or may blink/flash in different patterns to convey various messages to the user. In some embodiments, the user output device is a COB LEDs configured to display the battery charge level as a "bar graph." Additionally or alternatively, the user output devices 86 (see FIG. 5) of the power tool 10 may be embodied as any type of audio outputs, visual outputs (e.g., lights or various screens), and/or tactile outputs, by way of example.

Figure 5:
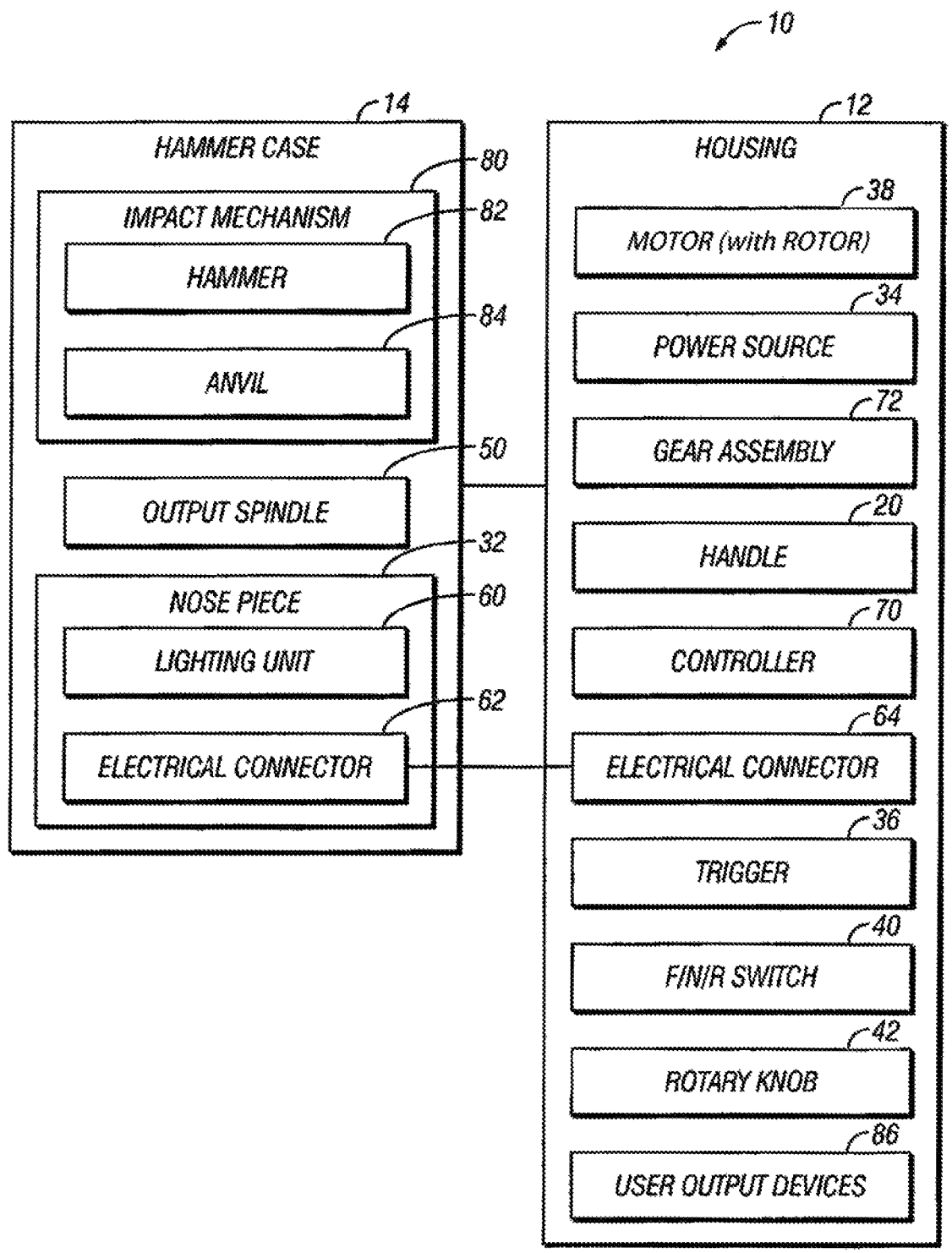
FIG. 5 is a simplified block diagram illustrating various components of the power tool of FIG. 1.

In the illustrative embodiment as indicated in the block diagram of FIG. 5, hammer case 14 supports an impact mechanism 80 and the output spindle 50. The hammer case 14 includes removable nose piece 32, which supports lighting unit 60 and includes a hammer case electrical connector 62 that is configured to mate with a corresponding housing electrical connector 64. The electrical connector in the housing 64 is connected to the battery and controller 70 of the power tool 10 and is configured to provide power and control signals to the electrical components of the hammer case 14, such as the lighting unit 60.

It is appreciated that impact mechanism 80 of the power tool 10 may be any type of impact mechanism, such as a ball-and-cam impact mechanism (sometimes called a "Potts" mechanism) or a Maurer impact mechanism. In general, impact mechanism 80 includes an anvil 84 coupled to output spindle 50 and configured to rotate about an output axis 66 and a hammer 82 coupled to the output of the motor and configured to rotate in response to rotation of motor 38. Hammer 82 includes one or more jaws (not shown) that are configured to strike anvil 84, and thereby cause anvil 84 and the connected output spindle 50 to rotate.

The illustrated output spindle 50 is formed as a single unitary, monolithic piece. A first end of output spindle 50 extends outside hammer case 14 and is configured to couple to any number of work attachments. A second end of output spindle 50 extends inside hammer case 14 and is coupled to anvil 84. In some embodiments, the second end of output spindle 50 may be formed with two jaws to create anvil 84. The jaws of hammer 82 are configured to impact anvil 84 to functionally drive output spindle 50 in response to rotation of motor 38. The term "functionally drive" is herein defined as a relationship in which the jaws of hammer 82 rotate to impact the respective jaws of anvil 84 and, thereby, cause intermittent rotation of output spindle 50. In some embodiments, the impact cycle is repeated twice every rotation of motor 38.

Hammer case 14 also includes a removable nose piece 32 positioned to be at the front of hammer case 14 of the power tool 10. Nose piece 32 includes lighting unit 60 and hammer case electrical connector 62 and is configured to keep the mating electrical connectors from inadvertently disconnecting.

As noted above, hammer case 14 may include at least one lighting unit 60. In the illustrative embodiment, lighting unit 60 on hammer case 14 is a headlight configured to illuminate the work space of the power tool 10. In the illustrative embodiment, the headlight is positioned in nose piece 32 of hammer case 14 such that it surrounds output spindle 50 and is configured to shine light along the output axis 66, defined by output spindle 50, and illuminate a work space of the power tool 10. Lighting unit 60 includes one or more lights installed in hammer case 14, a protective clear lens 61 configured to prevent damage and contamination to the lights caused by foreign debris, and electrical circuitry to provide power and control signals to the headlight. In the preferred embodiment, the one or more lights are COB LEDs formed as an annular ring that surrounds output spindle 50 and illuminates the work space of the power tool 10. In another embodiment, the one or more lights are two or more COB LEDs formed as arcs that cooperate to surround the output spindle.

Figure 6:
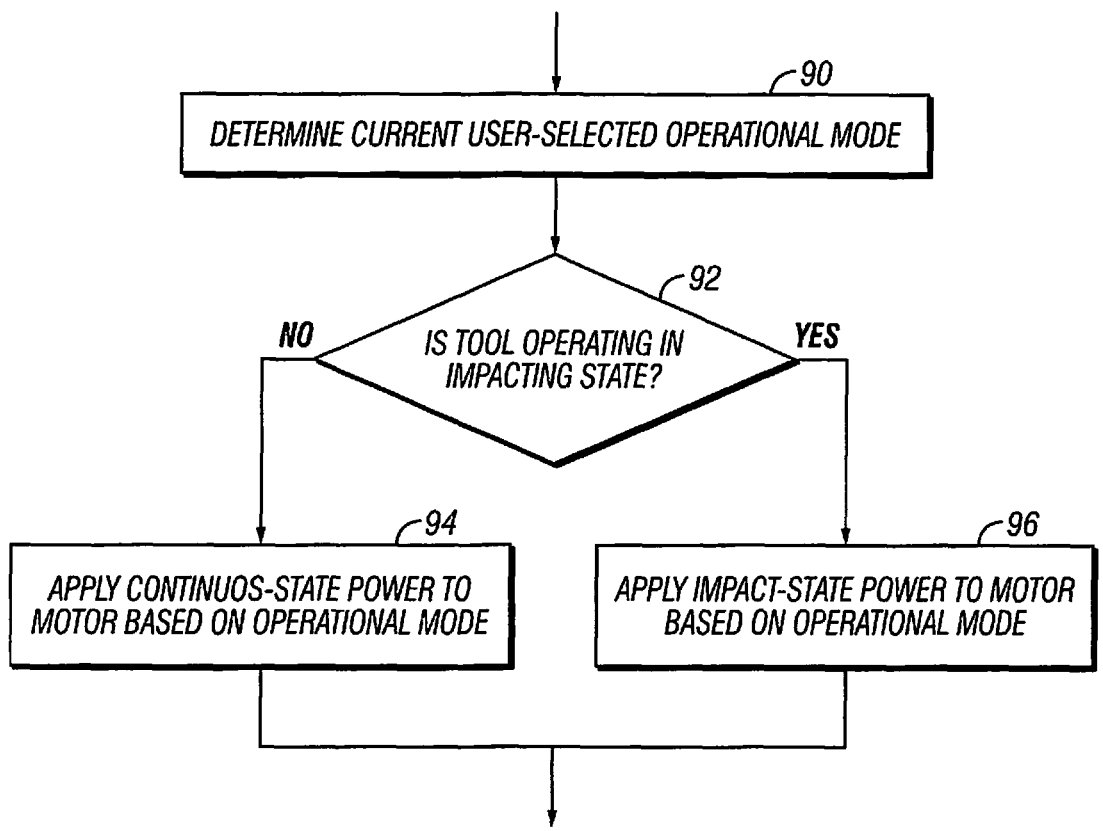
FIG. 6 is a flow chart illustrating of one illustrative embodiment of a process for implementing user-selected operational modes of the power tool of FIG. 1.

In the illustrative embodiment, the power tool 10 includes one or more user-selectable operational modes that are configured to allow the user to quickly perform tasks while preventing the user from over torqueing a fastener or otherwise damaging a work piece. Referring now to FIG. 6, a method for implementing the user-selected operational modes of the power tool 10 is shown as a simplified flow chart. The illustrative method comprises determining an operating phase of the fastening operation being performed by the power tool 10 as is indicated by reference numeral 90 and applying power to motor 38 of the power tool 10 based on the operating phase and the user-selected operational mode.

Controller 70 (see FIG. 5) of power tool 10 is operable to determine the phase of the fastening operation in which the power tool 10 is operating as indicated by reference numeral 92 in FIG. 6. In general, a fastening operation of an impact tool can be broken down into two distinct phases: (1) a continuous run phase 94 and (2) an impacting phase 96. Continuous run phase 94 occurs when the fastener is being run down. During continuous run phase 94, output spindle 50 is directly coupled to the rotor (not shown) of motor 38. This phase is characterized by high-speed, continuous rotation and low output torques. When the output spindle experiences more rotational resistance from the fastener being rotated by the impact tool, the impacting phase begins. During impacting phase 96, output spindle 50 experiences intermittent rotations related to the operation of the impact mechanism, lower rotational speeds, and higher output torque.

Determining the operating phase 90 of an impact tool that uses a brushless DC motor may be performed using a number of different methods. During operation of impact tool 10, the brushless DC motor requires controller 70 (e.g., a microprocessor) to switch power on and off through the various windings of the motor with precise timing. As such, controller 70 of power tool 10 monitors the rotational position and/or speed of motor 70. Additionally, power tool 10 may include one or more sensors to measure an amount of electrical current going through the motor windings. The sensed current may be used to determine the operational phase of the power tool 10 or it may be used to shut the motor off if the current becomes dangerously high.

Figure 7:
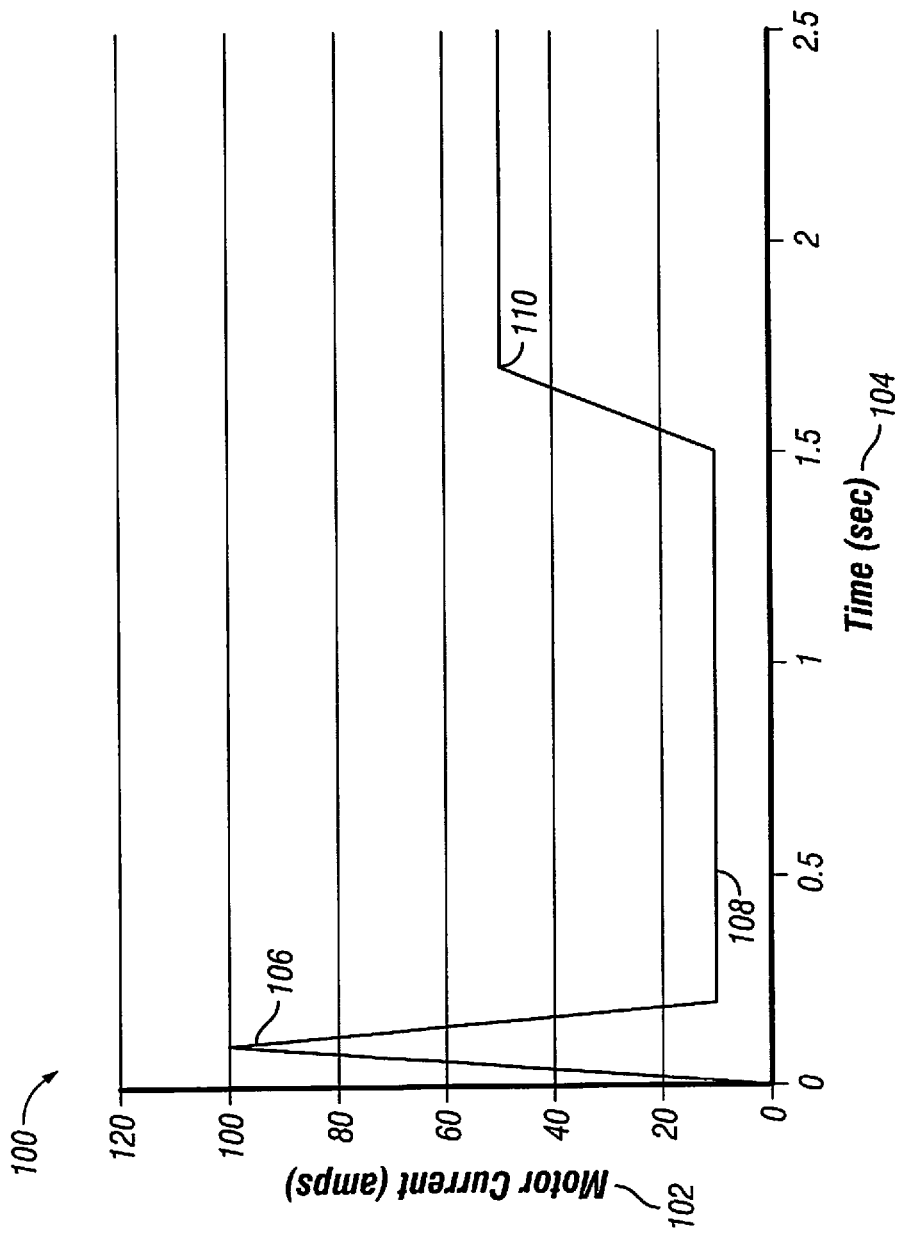
FIG. 7 is a graph representing the current delivered to a motor of the power tool of FIG. 1 while operating in a reduced power mode.
Figure 8:
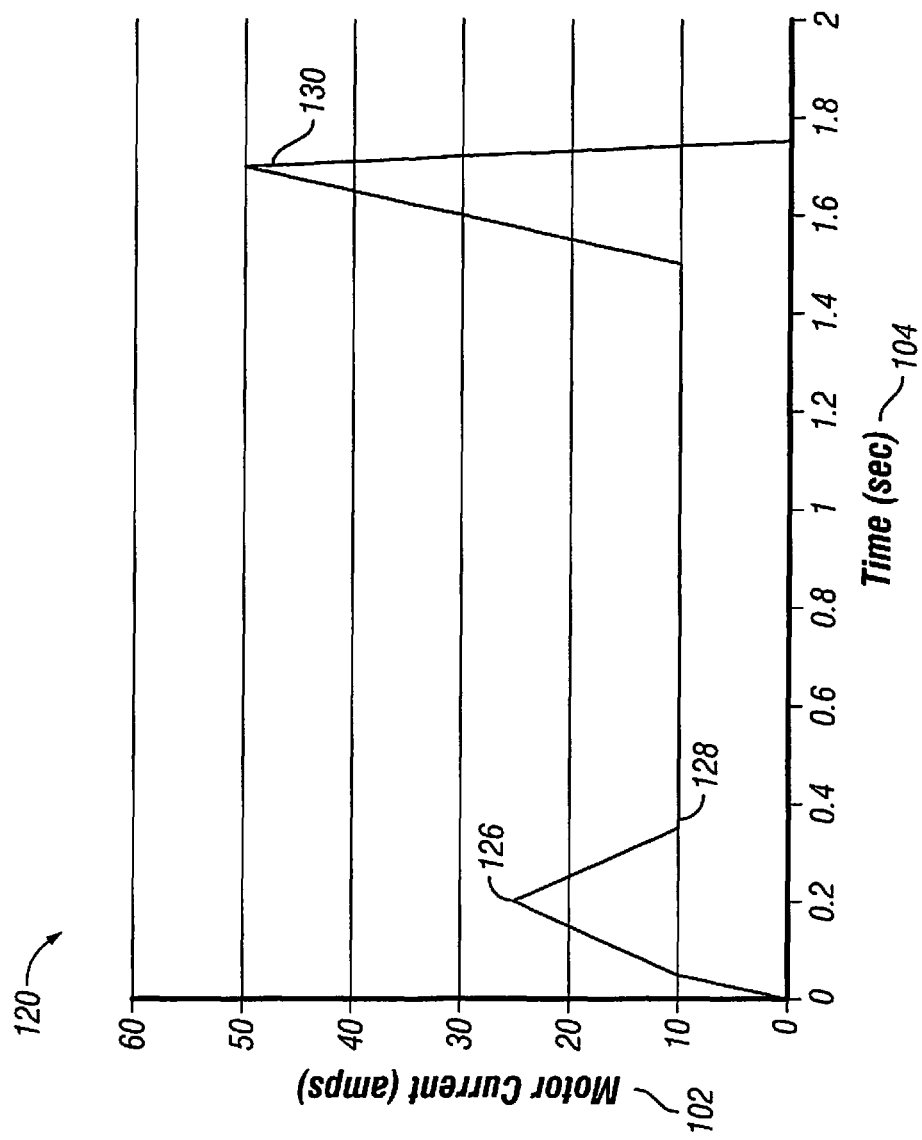
FIG. 8 is a graph representing the current delivered to the motor of the power tool of FIG. 1 while operating in a snug-up mode.

In the illustrative embodiment, the operating phase of the power tool 10 is determined by analyzing the current of the electric motor. For example, as illustrated in charts 100 and 120 in FIGS. 7 and 8, respectively, during the impacting phase, the motor draws more current than during the continuous run phase. At the beginning of a fastening operation, when the motor begins rotating, there is an initial spike 106 and 126, respectively, in the current supplied to the motor. After the motor is rotating at full speed, the current required to maintain the speed of rotation of the motor is relatively low. Once the power tool 10 starts impacting, the current sharply rises because the load applied to the motor becomes greater due to the operation of the impacting mechanism. The various operational phases of the power tool 10 can be determined by monitoring for the rise in current drawn by the motor during the impacting phase.

The power tool 10 includes several operational modes selectable by the user through a user interface. These operational modes control the power output of the motor based on the phase of operation of the power tool 10. For example, if the power tool 10 is in a reduced power mode, full power will be delivered to motor during the continuous run phase and a reduced amount of power will be delivered to the motor during the impact phase.

In the illustrative embodiment, the user interface that is operable to select the various operational modes is knob 42 positioned on rear portion 18 of the power tool 10. Each position of knob 42 corresponds to a particular user-selectable operational mode. The power tool 10 may include any number and type of sensors (e.g., Hall-effect sensors, potentiometers, etc.) to convey the position of knob 42 to controller 70. In the illustrative embodiment, the power tool 10 includes four operational modes: a standard mode, a reduced power mode, a torque stick stability mode, and a snug-up mode. It will be appreciated that, in other embodiments, the power tool 10 may be provided with more or less than four operational modes.

The standard mode allows the user to operate the power tool 10 at full speed and full torque output during both the continuous run phase and the impacting phase. The standard mode gives the user full control of the power tool 10 through the trigger, but does not provide any particular protection against over-torqueing a fastener driven by the impact tool.

The reduced power mode allows the power tool 10 to operate at full speed when the fastener is being run down, for example, in the continuous run phase. After the power tool 10 enters the impacting phase, the controller reduces the power supplied by the motor, thereby reducing the rotation speed and the output torque of the output spindle. As shown by chart 100 in FIG. 7, that plots motor current 102 over time 104, when in the reduced power mode, the controller allows the motor to operate at full speed when the current through the motor is relatively low, as it normally would be when the fastener is being run down indicated at 108. When the power tool 10 begins to impact on the fastener, the current through the motor rises sharply as indicated at 110, which indicates to controller 70 that the impacting phase has begun and that the motor power shall be reduced. The reduced power mode allows the user to limit the torque applied to the fastener by the power tool 10 without having to manually reduce the power delivered by the power tool 10 (e.g., by easing off trigger 36) after the fastener has been run down and begins to tighten.

The torque stick stability mode may operate similarly to the reduced power mode described above. The torque stick stability mode is designed to reduce the vibrations or limit erratic oscillations of the impact mechanism when a torque stick or other extending apparatus is attached to output spindle 50. For example, when the user uses a torque stick or other extension in conjunction with an impact tool, the spring action of the torque stick or extension may cause the impact mechanism to oscillate in an erratic and unpredictable manner. This may cause the tool to vibrate excessively, it may cause discomfort to the user, it may cause excessive wear of the impact mechanism, or it may adversely affect the torque output of the power tool 10. To combat such effects, the controller may be configured to avoid specific operating speeds or bands of speeds that tend to excite oscillations. These speeds might be identified analytically or experimentally.

The snug-up mode allows the power tool 10 to rundown the fastener at a predetermined speed during the continuous run phase. In some embodiments, the run-down speed during the snug-up mode is less than the full speed of the motor. After the power tool 10 enters the impacting phase and begins to impact the output spindle, the power tool 10 will stop the motor after a predetermined amount of time of impacting. As shown in chart 120 of FIG. 8, when in the snug-up mode, controller 70 allows motor 38 to operate at a predetermined speed when the current through the motor is relatively low, as it normally would be when the fastener is being run down at 128. When power tool 10 begins to impact on the fastener the current through the motor will rise sharply at 130, which indicates to controller 70 that the impacting phase has begun and that the motor shall be turned off after a predetermined amount of time. Generally, the predetermined amount of time is determined by an internal clock of controller 70 of the power tool 10. The snug-up mode allows the user to apply a relatively small amount of torque to the fastener without adversely affecting the overall speed of the fastening operation. In some situations, the snug-up mode may allow the user to apply the final torque to the fastener with a hand operated wrench for fasteners where the amount of torque is critical. One advantage of the above mentioned user-selected operational modes is that the fastening speed of the power tool 10 is maintained during run-down, while the final torque applied to a fastener by the power tool 10 is limited.

In addition to the methods of determining transitions between operating phases described above, other methods may be used to detect the transition between operating phases of the power tool 10. For example, the operating phase of the fastening operation may be determined by detecting the speed of rotation of the motor. Monitoring motor speed may be accomplished by monitoring the frequency of the back electromagnetic field ("back EMF") coming from the motor, monitoring the output of an encoder positioned near the motor rotor, monitoring the output of a resolver positioned on the motor rotor, or monitoring the output of Hall-effect sensors positioned in close proximity to the rotor magnets of the brushless DC motor. Controller 70 may determine when the motor has decelerated due to an increased motor load (e.g., because the power tool 10 is now impacting). In another example, a motor drive can determine an abrupt change in motor torque by monitoring the control loop error values. As the motor load abruptly changes, the control loop error will increase dramatically indicating that the mechanism has begun to impact. In another example, the controller can monitor battery voltage. As the motor load and current draw of the motor increase, the internal resistance of the battery will cause its voltage to drop indicating that the mechanism is impacting. In yet another example, the controller may monitor the output signals of a microphone positioned in the power tool 10. When the mechanism begins to impact, the noise generated by the impact mechanism will be received by the microphone, which will generate an output signal sent to controller 70. In still another example, a sensor may be installed in or near the impact mechanism to determine if the hammer has moved axially rearward. This sensor might be embodied as a Hall-effect sensor, a linear variable differential transformer (LVDT), or a microswitch. In another example, a torque sensor may be installed between the motor and impact mechanism. When the measured torque increases dramatically, it indicates to the controller that the mechanism is impacting. Other types of sensors installed on the power tool 10 may include an anvil angle encoder, a hammer angle sensor, a hammer axial travel senor, an accelerometer on the hammer, a motor brush bounce sensor configured to detect brief interrupts caused when a brush leaves the commutator of the motor, a cone clutch integrated into the front of the power tool 10 configured to begin slipping at a preset torque, or a sensor to detect small torsional vibrations to determine the socket angle. It is contemplated that any of these feedback mechanisms (including any combination the feedback mechanisms mentioned above) may be used to monitor the operating phase of the power tool 10 in various embodiments.

In addition to the user-selectable operational modes described in detail above, the power tool 10 may include other user-selectable operation modes. For example, the power tool 10 may include a snug-up soft mode which includes rotating output spindle 50 at full speed during the continuous run phase, followed by impacting the output spindle at a reduced power for a fixed amount of time during the impacting phase. In another example, power tool 10 may include any of the modes as described above but concluded with a number of impacts in a reverse direction. In yet another example, power tool 10 may include a low torque or continuous mode where power tool 10 stays in the continuous run phase and never enters the impacting phase of the fastening operation. In still another example, power tool 10 may include a cross thread mode where, at the beginning of the continuous run phase, output spindle 50 rotates at a slow speed for a time period (or for a number of rotations) to ensure that the fastener being fastened is not cross threaded before the output spindle begins rotating at full speed. In another example, the controller may run the motor at a reduced speed while the fastener is being run down and shut off the motor immediately as the load on the motor increases to prevent any impacting from the mechanism, allowing power tool 10 to be used as a direct drive tool. In still another example, the power tool 10 may include user-selected operational modes tailored to specific industrial applications, such as tire changing, decking, steel erection, line work, or other industrial applications.

It is contemplated that various embodiments of the power tool 10 may include any combination of the operational modes described in the present disclosure. These various embodiments of power tool 10 may be mechanically identical but include different software (implementing different combinations of the operational modes), allowing for a diverse product line at reduced cost of product design and manufacturing.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present disclosure.

The invention claimed is:

1. A hand-held power tool comprising:
   a housing assembly supporting an electric motor having a rotor configured to rotate when the electric motor is supplied with power;
   an output spindle protruding from an output end of the housing assembly;
   wherein the output spindle is functionally coupled to the rotor such that the output spindle rotates about an output axis in response to a rotation of the rotor; and
   a user interface having a rotary knob coupled to the housing assembly in a rear portion of the housing opposite the output end in a generally longitudinal direction along the output axis, the rotary knob configured to select one of a plurality of operation modes of the handheld power tool via each position of the rotary knob;
   wherein the control of the power supplied to the electric motor is based on phases of a fastening operation of the hand-held power tool;
   wherein the phases of the fastening operations of the hand-held power tool are selected from the group consisting of a continuous run phase and an impacting phase;
   wherein the hand-held power tool further comprises a controller programmed to:
   (a) determine, using information provided from the user interface, a selected operation mode of the hand-held power tool,
   (b) detect, using information obtained by at least a first sensor of the hand-held power tool, a current change wherein more initial current in the impacting phase is supplied to the electric motor as compared to an initial current drawn by the electric motor during initial rotation of the electric motor during the continuous run phase, and by at least a second sensor of the hand-held power tool, a rotational speed of the electric motor,
   (c) determine the phase of the fastening operation in which the handheld power tool is operating in based on the detected current change and the rotational speed, and,
   (d) apply power to the electric motor based on the selected operation mode of the hand-held power tool and based on the determined phase of the fastening operation, wherein current applied to the electric motor in the impacting phase increases while load applied to the electric motor increases, and
   wherein the position of the rotary knob is conveyed to the controller via at least one Hall-effect sensor operably coupled with the hand-held power tool.

2. The hand-held power tool of claim 1, wherein the continuous run phase is characterized by a first rotational speed, continuous rotation, and low output torque until the output spindle experiences a threshold rotational resistance from a fastener being rotated by the hand-held power tool, wherein the impacting phase begins once the threshold rotational resistance from the fastener being rotated by the hand-held power tool occurs, and wherein the impacting phase is characterized by the output spindle experiencing intermittent rotations at a second rotational speed that is a lower speed than the first rotational speed, and is at a higher output torque.

3. The hand-held power tool of claim 1, wherein the plurality of operation modes includes a reduced power mode, and wherein during the impacting phase at the reduced power mode power is applied to the electric motor at a level that avoids operating speeds of the electric motor that create oscillations in the hand-held power tool that cause the hand-held power tool to vibrate.

4. The hand-held power tool of claim 1, wherein applying power to the electric motor based on the selected operation mode of the hand-held power tool and based on the determined phase of the fastening operation includes:
   (i) applying full power to the electric motor during the continuous run phase and the impacting phase when a first operation mode of the hand-held power tool is selected,
   (ii) applying full power to the electric motor during the continuous run phase when a second operation mode of the hand-held power tool is selected, and
   (iii) applying reduced power to the electric motor during the impacting phase when the second operation mode of the hand-held power tool is selected.

5. The hand-held power tool of claim 4, wherein applying power to the electric motor based on the selected operation mode of the hand-held power tool and based on the determined phase of the fastening operation includes:
   (iv) maintaining power to the electric motor for a predetermined amount of time after detection of the current change during the impacting phase.

6. The hand-held power tool of claim 1, wherein the controller is further configured to determine the phase of the fastening operation in which the handheld power tool is operating based on a voltage of a battery used to supply power to the electric motor.

* * * * *